Feb. 24, 1925.
C. BOUILLON
1,527,247
ELECTRIC MOTOR DRIVEN CHANGE SPEED DEVICE
Filed Oct. 15, 1921   2 Sheets-Sheet 1
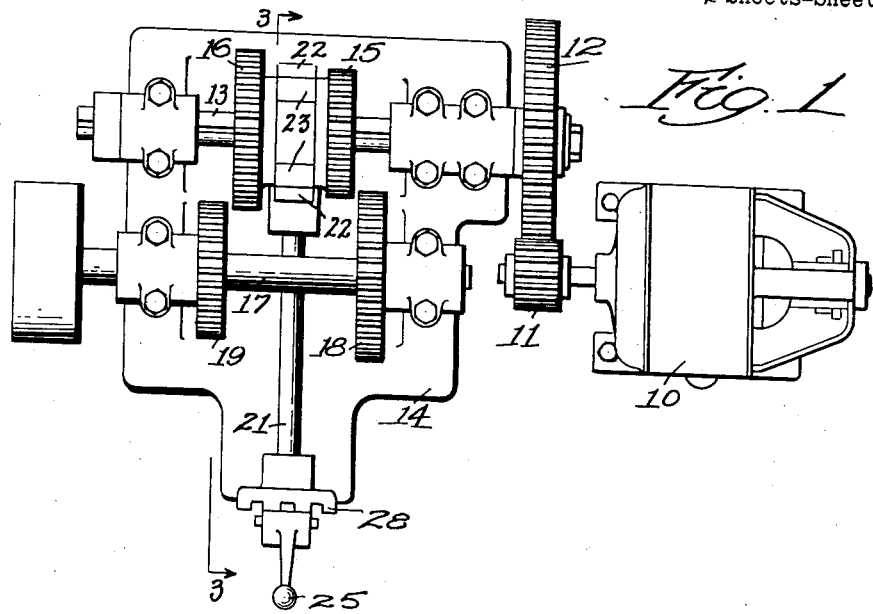
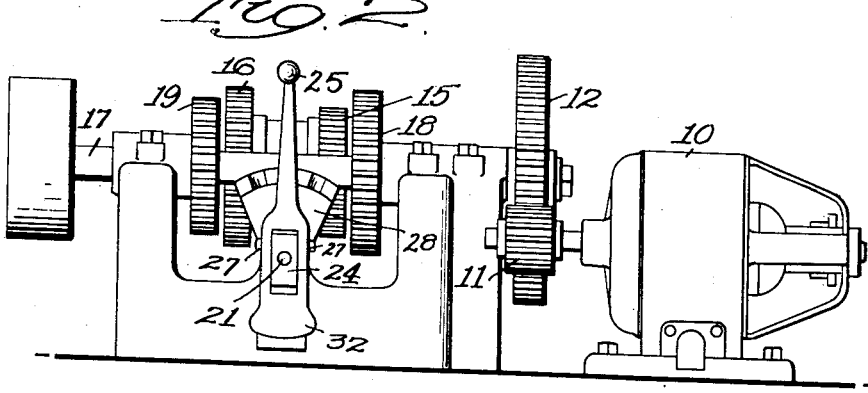
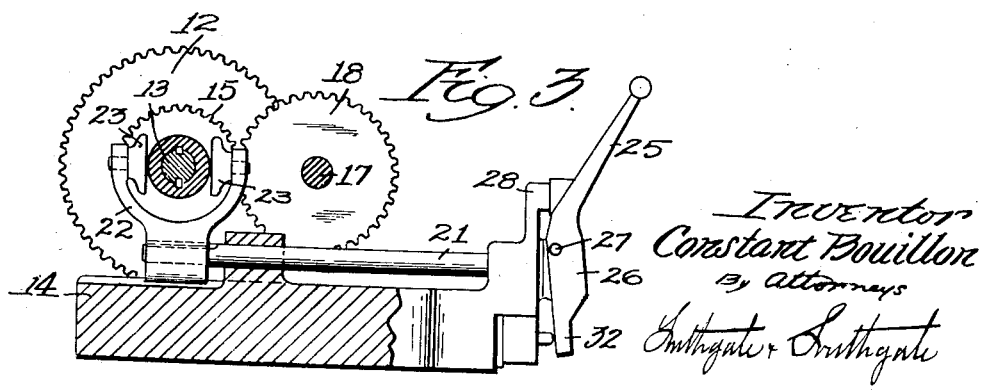
Inventor
Constant Bouillon
By Attorneys
Smithgate & Smithgate Feb. 24, 1925.
C. BOUILLON
1,527,247
ELECTRIC MOTOR DRIVEN CHANGE SPEED DEVICE
Filed Oct. 15, 1921
2 Sheets-Sheet 2
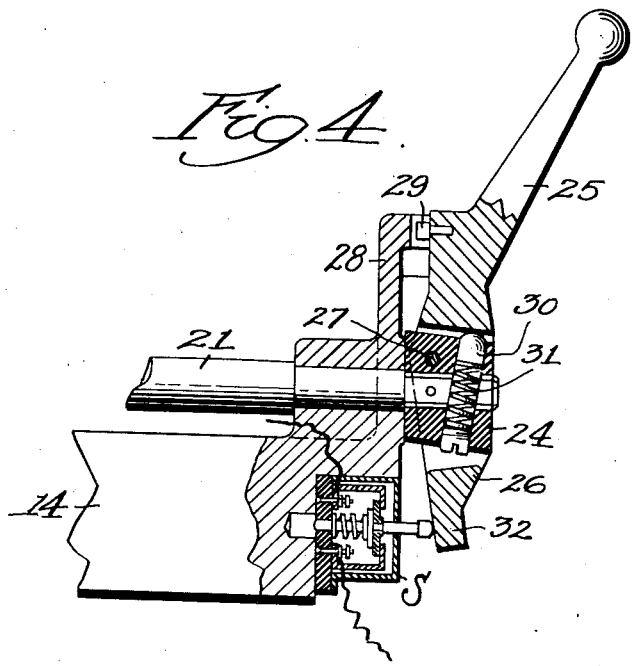
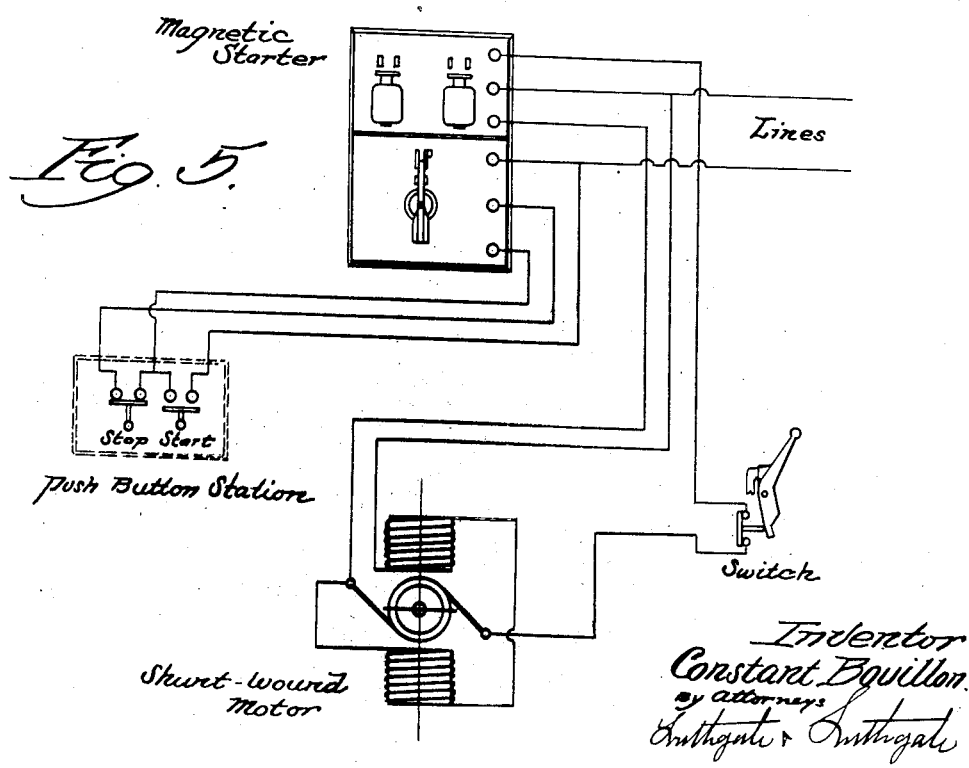

Patented Feb. 24, 1925.

1,527,247

UNITED STATES PATENT OFFICE.

CONSTANT BOUILLON, OF TORRINGTON, CONNECTICUT, ASSIGNOR TO HENDEY MACHINE COMPANY, OF TORRINGTON, CONNECTICUT, A CORPORATION OF CONNECTICUT.

ELECTRIC-MOTOR-DRIVEN CHANGE-SPEED DEVICE.

Application filed October 15, 1921. Serial No. 507,840.

*To all whom it may concern:*

Be it known that I, CONSTANT BOUILLON, a citizen of the United States, residing at Torrington, in the county of Litchfield and State of Connecticut, have invented a new and useful Electric-Motor-Driven Change-Speed Device, of which the following is a specification.

The object of this invention is to provide a new and improved electric motor driven change speed device. To this end the invention consists in combining with the operating connections or handle of such a change speed device, an electric switch controlling the motor and means arranged so that when said connections are operated to change the speed, the switch will be operated, and so that when the change is effected the switch will return to normal position. By this arrangement, the driving motor will be slowed or stopped before the changing of speeds takes place, thereby lessening the shock of the gears when the change is effected and whereby the motor will return to its normal speed, when the change is effected.

The best way now known to me for practicing the invention is illustrated in the accompanying two sheets of drawings, referring to which Fig. 1 is a plan view of a change speed device with my improvement applied thereto;

Fig. 2 is a front elevation thereof;

Fig. 3 is a sectional view on the line 3—3 of Fig. 1;

Fig. 4 is an enlarged view of the operating handle; and

Fig. 5 is a diagram illustrating the electric connections.

Referring to the drawings and in detail, 10 designates an electric motor which has a driving pinion 11 on its power shaft, which pinion 11 meshes with and drives a gear 12 secured on a shaft 13 journalled in the frame 14 of the change speed device. The shaft 13 is provided with one or more key-ways and fitted to slide thereon is a double gear 15—16 which is keyed to said shaft. Another shaft 17 is journalled in brackets on the frame 14 and has gears 18 and 19 secured thereto, and also a pulley which may be used to transmit the power at the various speeds. The above constitutes a simple form of change speed device. When the double gear 15—16 is shifted to the right, power is taken from the shaft 13 through gears 15 and 18 at one speed, and when the double gear is shifted to the left, power is taken through the gears 16 and 19 at an increased speed.

The operating connections for the change speed device may be arranged as follows: A shaft 21 is journalled in the frame 14 transversely to the shafts 13 and 17 and a yoke 22 is fixed on said shaft 21 having ear pieces 23 engaging the double gear 15, 16 so as to move the same on its shaft. A block 24 is keyed and held by a screw on the other end of the shaft 21. An operating handle 25 has a yoke 26 which is fitted on said block 24 and pivoted thereto by screws 27—27. A notched controlling segment or part 28 extends upwardly from one of the bearings of the shaft 21. The operating handle or lever 25 is provided with a part or pin 29 to engage the notches in the segment or part 28. A plunger 30, pushed upwardly by spring 31, is arranged in the block 24 so as to force the operating handle normally inwardly so that its pin 29 will come in one of the notches of the segment 28.

The operating handle or lever 25 has a downwardly extending flange 32 which is set in position to engage the shaft of an electric switch or cut out S arranged on the frame of the change speed device below the shaft 21. This switch is placed in circuit so as to control the speed of the motor or to stop the same, one convenient location being illustrated in Fig. 5 where a push button station and a magnetic starter are used with the electric motor and the switch is arranged in the armature circuit of said motor.

When a change of speed is to be effected, the handle 25 first is pulled outwardly so that its pin 29 will come out of a notch which will operate the switch to slow down the speed of the motor. Then the lever is shifted sideways to make the speed change and then the lever is released so that said pin again will come into a notch whereby the switch will return to normal position and the motor will resume its normal speed. By this arrangement a change of speed can be effected without any clashing of the gears and without any strain on the parts.

The details and arrangements herein shown and described may be greatly varied by a skilled mechanic without departing from the scope of my invention as expressed in the claims.

Having thus fully described my invention what I claim and desire to secure by Letters Patent:—

1. A change speed device, operating connections therefor, an electric motor for driving the device, an electric switch controlling the motor and having a normal operative position, and means arranged so that when said connections are operated to change speed the switch will be moved from normal operative position and so that when the change is effected and the connections released the switch will return automatically to normal operative position.

2. A change speed device, an electric motor for driving the same, an operating handle for the change speed device, an electric switch controlling the motor and having a normal operative position, and means arranged so that when said handle is operated to change speed the switch will be moved from normal operative position and so that when the change is effected and the handle released the switch will return automatically to normal operative position.

3. A change speed device, an electric motor for driving the same, operating connections for the change speed device, an electric switch controlling the motor and having a normal closed position, and means arranged so that when said connections are operated to change speed the switch will be moved to open position and so that when the change is effected and the connections released the switch will return automatically to normal closed position.

4. A change speed device, an electric motor for driving the same, an operating handle for the change speed device having a projection, a notched part or segment for said projection arranged so that when a change is to be effected the projection will first have to be removed out of a notch and so that when the change is effected the projection can move back into a notch, an electric switch controlling the motor having a normal operative position and arranged so that when the handle is moved to withdraw the projection from a notch the switch will be moved from normal operative position and so that when the handle is released the switch will automatically return to normal operative position.

5. A change speed device, an electric motor for driving the same, an operating shaft for the device, a block thereon, an operating handle pivoted on said block, a notched part, a projection on the handle co-operating therewith, a flange extending from said handle, an electric switch controlling the motor having a normal operative position and set in position to be engaged by said flange, the parts being arranged so that when the operating handle is moved to withdraw the projection from a notch the switch will be moved from normal operative position and so that when the handle is released so that the projection will again engage a notch the switch will automatically return to operative position.

6. A change speed device, an electric motor for driving the same, an operating handle for the change speed device, an electric switch controlling the motor and having a normal operative position, means arranged so that when said handle is operated to change the speed the switch will be moved from normal operative position, and a spring arranged so that when the handle is released the switch will be returned to normal operative position.

7. A change speed device, an electric motor for driving the same, an operating handle therefor, a notched part or segment, a projection carried by said handle co-operating therewith, a spring arranged to move said handle so that said projection normally will engage a notch, an electric switch controlling the motor having a normal operative position, and connections between the handle and the switch arranged so that when a change of speed is to be effected the handle will first be moved to disengage the projection from the notch and the switch from normal operative position and so that when said handle is released the handle will be moved so that said projection will engage a notch, and the switch will return to normal operative position.

In testimony whereof I have hereunto affixed my signature.

·CONSTANT BOUILLON.